(12) United States Patent
Kolodizner et al.

(10) Patent No.: US 10,154,133 B2
(45) Date of Patent: Dec. 11, 2018

(54) QUALITY-DEPENDENT PLAYBACK OF RECORDINGS

(71) Applicant: NICE-SYSTEMS LTD, Ra'anana (IL)

(72) Inventors: Efim Kolodizner, Ashdod (IL); Roni Krivoshey, Ramat Hasharon (IL); Tal Haguel, Kfar saba (IL); Oren Feld, Kfar saba (IL)

(73) Assignee: NICE-SYSTEMS LTD, Ra'anana (IL)

( * ) Notice: Subject to any disclaimer, the term of this patent is extended or adjusted under 35 U.S.C. 154(b) by 100 days.

(21) Appl. No.: 15/156,350

(22) Filed: May 17, 2016

(65) Prior Publication Data

US 2017/0339271 A1 Nov. 23, 2017

(51) Int. Cl.
| | | |
|---|---|---|
| *H04M 3/22* | (2006.01) | |
| *H04M 1/656* | (2006.01) | |
| *H04M 3/42* | (2006.01) | |
| *H04M 3/08* | (2006.01) | |

(52) U.S. Cl.
CPC ......... *H04M 3/2236* (2013.01); *H04M 1/656* (2013.01); *H04M 3/08* (2013.01); *H04M 3/42221* (2013.01); *H04M 3/42323* (2013.01)

(58) Field of Classification Search
CPC .................................................. H04M 3/2236
See application file for complete search history.

(56) References Cited

U.S. PATENT DOCUMENTS

| | | | |
|---|---|---|---|
| 9,313,332 B1* | 4/2016 | Kumar | H04M 3/5232 |
| 2010/0026575 A1* | 2/2010 | Maruhashi | H04B 7/0608 |
| | | | 342/372 |
| 2011/0090867 A1* | 4/2011 | Sono | H04W 36/28 |
| | | | 370/331 |
| 2013/0163731 A1* | 6/2013 | Yan | H04M 3/523 |
| | | | 379/85 |
| 2014/0244460 A1* | 8/2014 | Imai | G06Q 20/145 |
| | | | 705/34 |
| 2016/0323175 A1* | 11/2016 | Liu | H04L 12/6418 |

* cited by examiner

*Primary Examiner* — Joseph T Phan
(74) *Attorney, Agent, or Firm* — Soroker Agmon Nordman

(57) ABSTRACT

Responsive to concurrently recording on a plurality of recorders a telephonic interaction constructing a plurality of playlists, and according to faults identified while recording the plurality of playlists evaluating a quantitative quality score for each playlist in the plurality of playlists and presenting the playlists in a prioritized order according to the scores thereof.

10 Claims, 2 Drawing Sheets

QUALITY-DEPENDENT PLAYBACK OF RECORDINGS

BACKGROUND

The present disclosure generally relates to playback of recordings, and more specifically to playback of telephonic recordings.

Multiple recordings of telephonic calls may vary in quality such as due to electrical interferences or cross-talks. In telephonic calls carried out on networks, such as VoIP, quality of recordings may vary due to factors such as distortion of data in the communications, packets loss or incorrect timing.

Thus, having recordings obtained from telephonic calls may thus vary in quality, even calls concurrently obtained from a plurality of recorders.

SUMMARY

One exemplary embodiment of the disclosed subject matter is a method for prioritization of recorded playlists, comprising concurrently recording on a plurality of recorders constructed and configured to record telephonic interactions and identify faults occurring therein a telephonic interaction provided by a PBX (Private Branch Exchange) under a control of a computerized apparatus, thus recording and constructing in a storage device a plurality of playlists along with the identified faults in the recording of the playlists, and subsequent to completing the interaction, evaluating for each playlist in the plurality of playlists a quantitative quality score according to the identified faults of each of the playlists, thus reflecting by each score the quality of each playlist in the plurality of playlists, and further presenting the playlists in a prioritized order according to the scores thereof.

In some embodiments, evaluating the quantitative quality score is constructed by a weighted combination of quantifications of faults.

In some embodiments, the weights are determined experimentally.

In some embodiments, presenting the playlists comprises displaying the playlists in a prioritized order, thus facilitating for a user to select playlists according to the evaluated quality thereof.

In some embodiments, presenting the playlists comprises sounding the playlists in a prioritized order, thus sounding the contents of the telephonic interaction to a certain degree of fidelity.

Another exemplary embodiment of the disclosed subject matter is a computerized system for prioritization of recorded playlists, comprising a PBX (Private Branch Exchange) for providing a telephonic interaction, a CTI apparatus (Computer Telephony Integration apparatus) interfacing with the PBX for telephonic call flow control, a plurality of recorders configured to record the telephonic interaction, a computerized apparatus as a controller interfacing with the CTI and configured to control the operations of the plurality of recorders and further configured to obtain information about the progress of and occurrences in the telephonic interaction, a storage device linkable with the plurality of recorders and the controller for storing the playlists and information related to the progress of and occurrences in the telephonic interaction, and a processor operative by a program to evaluate the qualities of the stored playlists and to assign scores of qualities to each playlist and further to prioritize the playlists according to the scores thereof.

BRIEF DESCRIPTION OF THE DRAWINGS

Some non-limiting exemplary embodiments or features of the disclosed subject matter are illustrated in the following drawings.

Identical or duplicate or equivalent or similar structures, elements, or parts that appear in one or more drawings are generally labeled with the same reference numeral, and may not be repeatedly labeled and/or described.

Figure 1:
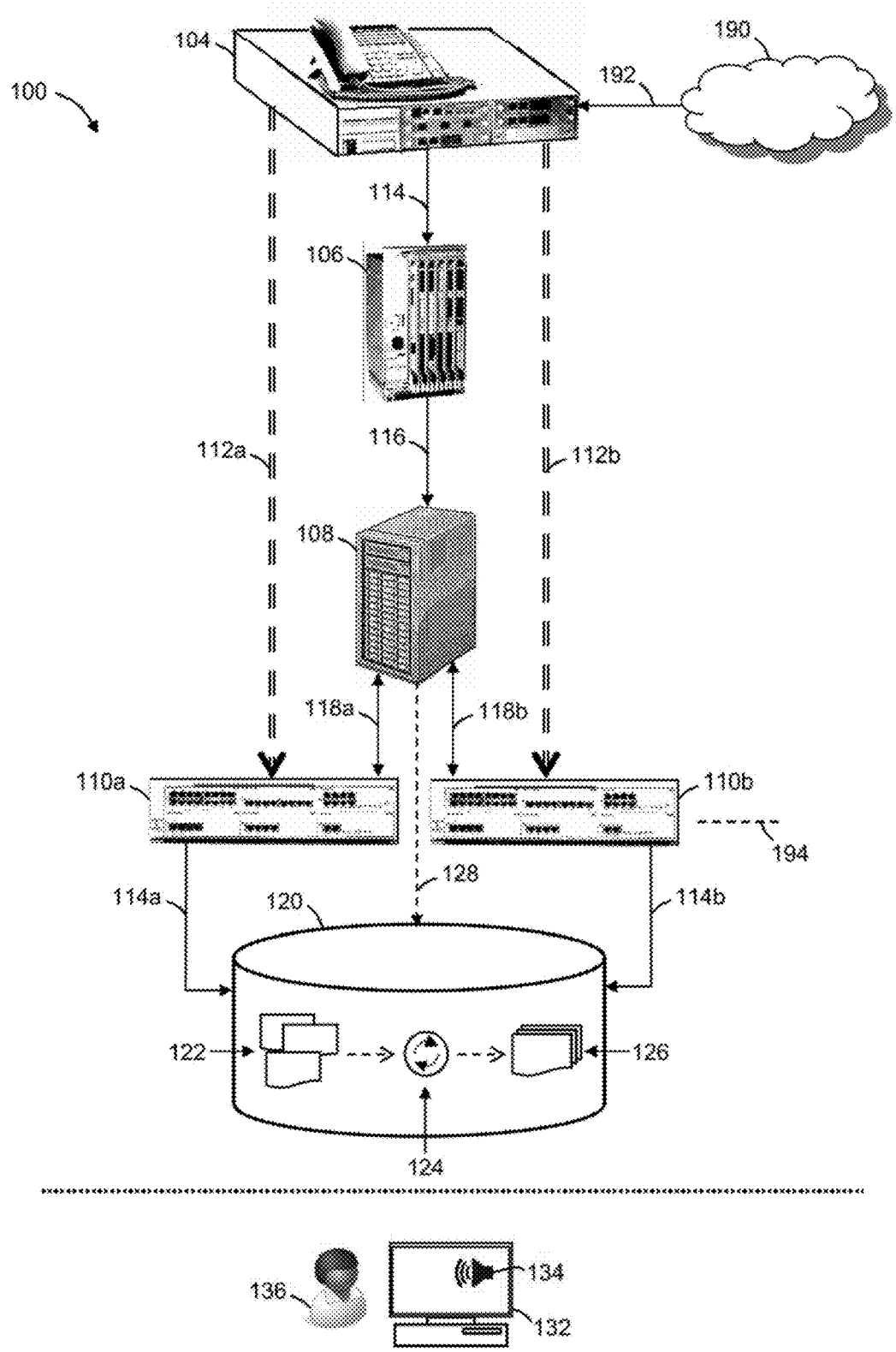

References to previously presented elements are implied without necessarily further citing the drawing or description in which they appear.

Figure 2:
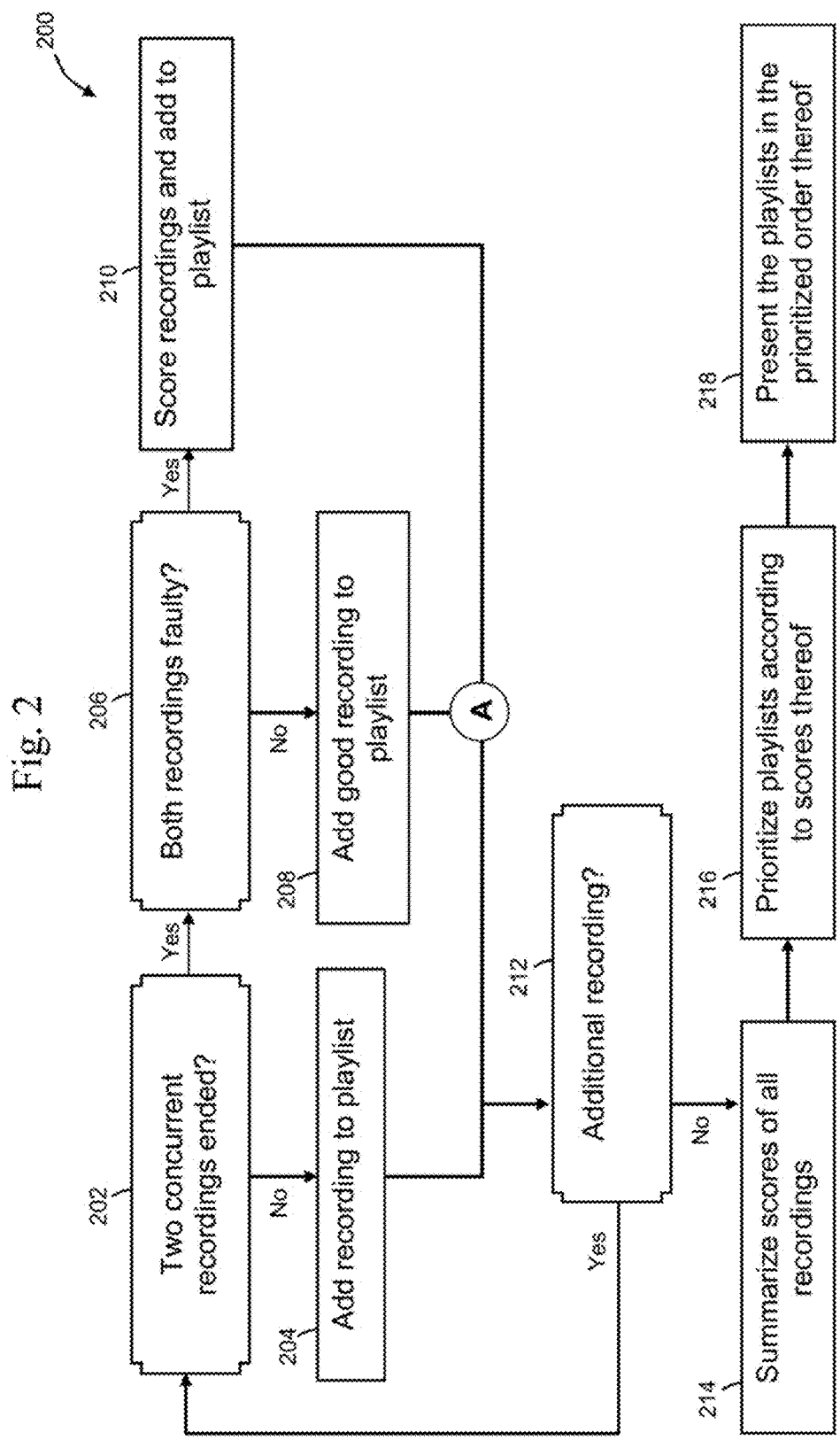

FIG. 1 schematically illustrates a system of apparatuses and some interconnections therebetween for concurrently recording of calls, according to exemplary embodiments of the disclosed subject matter; and FIG. 2 outlines operations and some controls therebetween in concurrently recording a plurality of calls, according to exemplary embodiments of the disclosed subject matter.

DETAILED DESCRIPTION

In the context of the present disclosure, without limiting, term 'telephonic' relates to data transfers between two or more devices. The data may be of any form, such as voice, image or video or any other medium, transferable over any type or combination of communication facilities, such as PSTN (Public Switched Telephone Network), computer networks, Internet or wireless communications.

In the context of the present disclosure, without limiting, the term 'recording' is unambiguously directed to two concepts; one concept is the operation of converting audio signals to a storable format or an organization, and the other concept relates to data obtained from the conversion operation. Thus, the terms are unequivocally distinct as evident in the context thereof and as the first one relates to an operation and the other one related to a noun such as data.

In the context of the present disclosure, without limiting and unless clearly otherwise evident, the term 'interaction' denotes operations or actions taken in and/or for and/or involved in conducting and recording a telephonic call and denoted also as a telephonic interaction.

In the context of some embodiments of the present disclosure, without limiting, a playlist is a set of recordings of telephonic interaction, inclusive of recordings of handovers between parties of the interaction. It is noted that a playlist may include one recording of the interaction. The playlist is amendable, at least partly, to an audible presentation.

In the context of the present disclosure, without limiting the scope thereof, playlists are recorded over a network, possibly at least in an environment with electrical interferences.

As used herein, the term 'parallel' or 'concurrent' with respect to operations implies one or more operations operative in a practically and/or sufficient concurrent manner, yet not necessarily strictly simultaneously.

In the context the present disclosure, without limiting, the term 'PBX' (Private Branch Exchange) denotes any instrument or apparatus that provides a telephonic access and switching and/or routing.

In the context of the present disclosure the term CTI apparatus (Computer Telephony Integration apparatus) is as known in the art, for example products of Avaya (Avaya Inc.), Cisco (Cisco Systems, Inc.), Alcatel (ALCATEL-LUCENT S.A.) or Genesys (Genesys Telecommunications Laboratories). Yet, without limiting, a CTI apparatus denotes any data processing device, such as a computer, having hardware components for communicating and/or intercommunicating with a PBX. The communication and/or intercommunication generally comprise operations such as call answering, call forwarding or a conference call, as well as acquiring metadata of a call. A CTI apparatus is also referred to as CTI server, and for brevity, a CTI apparatus is also referred to as 'CTI'.

In some embodiments, the CTI apparatus supplies metadata in a particular format and/or by a particular protocol and/or interaction, likely of possibly different from another CTI apparatus. In some embodiments, according to the apparatuses used the CTI transfers also audio from the PBX.

For brevity and unless otherwise specified, referring to a call implies a telephonic call.

The terms cited above denote also inflections and conjugates thereof.

When having a plurality of playlists concurrently recorded on a plurality of recorders one might assume, at least naively, that the playlists are identical or at least are of same or similar qualities.

Still, however, notwithstanding the simultaneous recording, each recording might be adversely affected differently. For example, by different loss of recorded sections, different fragmentations of recordings, different distortions of the recorded signals or different loss of communication packets.

One technical problem dealt by the disclosed subject is how to evaluate the quality of playlists concurrently recorded on a plurality of recorders.

Another technical problem dealt by the disclosed subject is selecting the best playlists from a plurality of playlists concurrently recorded according to the evaluations thereof.

A technical solution according to the disclosed subject matter is evaluating the quality of playlists by a weighted combination of the contributions of faults in the playlists. Thus, according to the evaluations the apparently best playlist is selected. Likewise and/or alternatively, the apparently best playlists may be selected according to decreasing quality evaluations, thus providing or at least approximating a complete playlist A potential technical effect of the disclosed subject matter is sounding an intelligible playlist even if some of the playlists are faulty due to recording thereof in acoustically and/or electrical problematic environment.

A general non-limiting presentation of practicing the present disclosure is given below, outlining exemplary practice of embodiments of the present disclosure and providing a constructive basis for variant and/or alternative and/or divergent embodiments, some of which are subsequently described.

FIG. 1 schematically illustrates a system 100 of apparatuses and some interconnections therebetween for concurrently recording of calls, according to exemplary embodiments of the disclosed subject matter.

System comprises a PBX, denoted as a PBX 104, which is connected, as illustrated by an arrow 192, to a telephonic infrastructure or network, illustrated figuratively as a cloud 190.

As schematically illustrated by an arrow 114, the PBX is further connected to a CTI, denoted as a CTI 106. As schematically illustrated by an arrow 116, the CTI is further connected to a recoding controller, or for brevity a controller, denoted as a controller 108.

Generally, in some embodiments, controller 108 is a computerized apparatus having components for interacting with PBX 104 and CTI 106 and with one or more audio recorders. For example, controller 108 transfers from CTI 106 data for telephony management and accordingly provides control data to the one or more recorders to manage the recording operations of the one or more recorders such as starting or stopping recording and/or transferring of the recorded data to a storage device, generally together with information of the progress and occurrences during recording.

According to exemplar embodiments of the present disclosure, system 100 comprises a plurality of recorders operating in parallel under the control of controller 108. The plurality of recorders are collectively referred to as recorders 110, where a dashed line 194 represents any number beyond one of recorders 110. For clarity in some cases each of recorders 110 is referred to a unit of recorder.

For brevity and clarity, controllers 110 are exemplified by two instances of a recorder, denoted as a recorder 110a and a recorder 110b, that are controlled by controller 108 as schematically denoted by an arrow 118a and an arrow 118b, respective to recorder 110a and a recorder 110b. Arrow 118a and an arrow 118b are bidirectional indicating that information and/or signals are transferred therebetween.

Audio signals and/or audio data of calls from PBX 104 are transferred to recorders 110 by any suitable technique and/or channel, such as a data link between PBX 104 and recorders 110, as shown schematically and/or virtually by an arrow 112a and an arrow 112b respective to recorder 110a and a recorder 110b. In some embodiments, the audio is transferred to recorders 110 directly from PBX 104 such as by an RTP (Real-time Transport Protocol), optionally under the control of controller 108. Optionally or alternatively, the audio is transferred via CTI 106 and controller 108. Further optionally, in some embodiments, other methods and/or protocols are used to supply audio to recorders 110.

The recorded data from recorders 110, illustrated schematically as collection of recordings 122, are provided as schematically denoted by an arrow 114a and an arrow 114b, respective to recorder 110a and a recorder 110b, to a database or any other suitable storage device, collectively denoted as database 120.

Generally, once recorders 110 are started and/or re-started, the audio signals as provide by PBX 104, as illustrated by arrow 112a and arrow 112b, are recorded. Additionally, during the recording of the audio signals each recorder collects information related to the operation thereof, such as recording duration, number of packet loss and faults in the network and/or storage device such a database 120 and/or any device used to store the recordings. The collected information is associated with and/or linked with the respective recordings such as by records in database 120 respective to the recordings or by any suitable manner such as in tags related to the recordings, as shown schematically by a dashed arrow 128.

Database 120 is associated or linked with or embeds a program or a process operative on a processor, denoted collectively as a processor 124. Processor 124 with the program is configured and operative to evaluate the qualities of recordings 122 as further elaborated below, thereby assigning scores of qualities to recordings 122 according to the evaluations, thus yielding an ordered list of recordings 122 according to decreasing scores as evaluated by processor 124, the ordered list is denoted as a list 126.

It is noted that each recorder, such as recorder 110a and recorder 110b, that concurrently record an interaction may produce different parallel recordings for the same interaction due to the effects of the operational environments thereof. It is further noted that each recorder may produce or generate several recordings of the same interaction and, thus, several playlists would be available. Accordingly, there is not necessarily a one-to-one correspondence between the number or recorders and the number of playlists derived from the recorders.

In some embodiments, the evaluated recording or, in other words, the evaluated playlists, such as list 126, may be provided to and/or requested by a computerized device, denoted as a playback manager 132, according to the highest evaluated quality. The device has and/or linked with a sounding component, denoted as a speaker 134, so that the top evaluated playlists are sounded and possibly heard by a party listening thereto, denoted as a person 136.

It is noted that in case a plurality highly evaluated playlists complement each other in terms of timing, the playlists are sounded one after the other. For example, if the top evaluated playlist is fault-free or with sufficiently small amount of faults from t1 to t2, and the second to top evaluation playlist is fault-free or with sufficiently small amount of faults from t3 to t4, where t1-t2 and t3-t4 are non-overlapping or having sufficiently negligible overlap, then the first playlist is initially played and the second one played subsequently, thus possibly completing each one to jointly sound a likely acceptable playlist from t1 to t4. Evidently, the same applies for a plurality of playlists that may, to some extent, complement each other. Further evidently, in case the top evaluated playlist is sufficiently rid of faults then that playlist is solely sounded.

In some embodiments the playlists are presented to person 136 in decreasing evaluations, optionally with indications where of the degree of quality corruptions in durations of the playlists, and person 136 may select what playlists to sound and in what order. Optionally or alternatively, playback manager 132 determines what playlists to sound an in what order based on the quality of the playlists in various timing sections thereof. Further optionally or alternatively, playback manager 132 suggest to person 136 what playlists to play and in what order.

Naturally, however, in case a play list is scored sufficiently high so that no faults has occurred and/or only negligible amount of faults has occurred relative to the duration of the playlist then that playlist is selected to be sounded as described hereinabove.

Optionally or alternatively, the evaluated recordings 122 may be provided by any different method, such as by tagging each or recordings 122, and the evaluated recordings 122, such as list 126, may be stored in any device rather than in database 120.

It is noted that processor 124 and/or the program thereof or associated therewith program may be located in any device rather that database 120. Likewise, in some embodiments, recordings 122 and/or list 126 and/or the evaluated recordings may be stored on different devices rather than in database 120.

It is further noted that the connections illustrated by arrow 112a and 112b may be derived from one connection from PBX 104 and subsequently split towards recorders 110. Likewise, the connections illustrated by arrow 118a and 118b may be derived from one connection from controller 108 and subsequently split towards recorders 110. In a similar though differing manner, the connections illustrated by arrow 114a and arrow 114b may be converge into one connection that is provided to database 120.

In some embodiments, recorders 110 may be combined and/or embedded in one device, yet each of recorders 110 is operative separately and independently.

It is yet emphasized that the apparatus and/or components of system 100, such as PBX 104, CTI 106, controller 108 or database 120 are linked therebetween over one or more networks (not shown).

In some embodiments, the CTI and/or the controller may be duplicated respective to recorders 110, akin to the configuration described in U.S. application Ser. No. 14/714,374 to the present applicant and having at least one common inventor.

In some embodiments of the present disclosure, recordings or playlists are evaluated or scored for quality thereof by a weighted combination of the contributions of faults in the playlists as determined during the recordings.

In some embodiments, the scores is evaluated as in formula (1) below:

$$\text{Score} = 1 - q\text{Errors} + W_p * q\text{Packet loss} + W_d * q\text{Recording Duration} \quad (1)$$

Where:
qErrors is a quantification of the errors that occurred in a playlist, such as the number of the errors or some derivation thereof such as according to the distribution of the errors in the playlist.

$W_e$ is a weight or intensity determining the contribution of the quantification of errors to the score.

qPacket loss is a quantification of the communication packets lost in communication with a recorder a playlist, such as the number of the lost packets or some derivation thereof such as according to the distribution of the lost packets in the playlist.

$W_p$ is a weight or intensity determining the contribution of the quantification of lost packets to the score.

qRecording Duration is a quantification of the duration of a playlist or some derivation thereof such as relative durations between two or more playlists.

$W_d$ is a weight or intensity determining the contribution of the quantification or effect of duration of the playlists to the score.

In some embodiments the weights are determined experimentally by some derivations that may be verified and/or adjusted, at least partly, by experimentations.

Regarding the errors quantifications, the weights thereof is relatively higher with respect to other weights since that quantification can influence the recording quality to a large extent relative to the other quantifications, and might even amount to loss of recordings. Thus, generally or by default $W_e$ is set to 0.7 in case errors were identified during recording or as 0 in case no errors were identified.

Packet loss or equivalent or similar communication failures influences the recording quality directly on, amounting to adversely affecting the ability for real-time and/or off-line voice processing and even adversely affecting the ability for a user to understand what happen during the conversations.

Regarding packets loss, in some embodiments, quantification of packet loss is calculated as a percentage of an allowed threshold that is calculated and/or experimentally determined. Thus, generally or by default $W_p$ is set to 0.25.

Regarding duration, it may be generally appreciated that duration of a recording affects the whole call experience; namely, the longer the duration the more of the recorded conversation may be intelligibly heard. Thus, generally or by default $W_d$ is set to 0.05.

In some embodiments, recording durations are calculates as a percentage of difference between 2 recordings, where, generally, the duration of 2 parallel recording can be different up to 1-2 seconds.

In some embodiments, the score are normalized to 1 and/or constructed otherwise such as relative to 1. Generally and by way of example, the score is formed such that a higher score implies fewer faults.

Thus, for example, in case for a playlist designated as playlist(1) there are no errors and no difference in duration of the recording but yet packets loss of 30%, then the score is computed as:

$$Score(1)=1-(0+0.3*0.3+0)=0.91$$

Or, for example, in case for a playlist designated as playlist(2) there are no errors but packets loss of 20% and duration d difference in duration of the recording but yet packets loss of 30% and duration difference of 5% then the score is computed as:

$$Score(2)=1-(0+0.3*0.2+0.05*0\ 0.05)=0.9375$$

Thus, Score(2) is higher than Score(1), implying, that, overally, playlist(1) is less flawed then playlist(2), at least according to the exemplary cases discussed hereinabove.

It is noted that, in some embodiments, scores may be determined in various manners or variations. For example, other factors may be taken into account, such as communication signal strength and/or stability, or, for example, the combination of the factors may be non-linear at least for some factors which are increased or decreased more appropriately than weights.

FIG. 2 outlines operations 200 and some controls therebetween in concurrently recording a plurality of calls, according to exemplary embodiments of the disclosed subject matter.

For brevity, it is assumed by way of example, without limiting, that recording of an interaction has ended, and that the playlists recorded on a plurality of recorders share common timings.

In operation 202 it is checked whether two concurrently recorded recordings were finished.

In case of a negative outcome, i.e. one recording has been finished, then in operation 204 the sole recording is added to a playlist, generally and by way of example stored in a database, and control proceeds to a state denoted as 'A'.

In case the outcome of operation 202 is positive, i.e. two concurrent recordings have been finished, then in operation 206 it is checked whether both recording are faulty, for example as detected during recording and informed to a recording controller.

In case of a negative outcome, i.e. both recording are good, then in operation 208 the recording are added to the playlist, and control proceeds to a state denoted as 'A'.

In case the outcome of operation 206 is positive, i.e. both recording are faulty, then in operation 210 the recordings are added to the playlist and, in some embodiments, are scored such as described above, and control proceeds to a state denoted as 'A'.

Subsequently, control proceeds from state 'A' to operation 212 where it is checked whether an additional recording has been finished. In case a positive outcome, i.e. another recording was ended, then control is transferred anew to operation 202.

In case of a negative outcome of operation 212, i.e. no recording was ended, then in operation 214 scores of all recordings are computed if not done yet. Further, in operation 216, playlists are prioritized according to scores thereof.

Yet further, in operation 218, the playlists are presented in the prioritized order thereof, such as described above regarding playback manager 132.

It is noted that operations 200 may be varied, for example, when checking for two recording yet a check for a plurality of recoding may be done.

It is further noted that in adding to a playlist may, in some embodiments, imply adding to a collection of playlists such as in the database.

There is thus provided according to the present disclosure a method for prioritization of recorded playlists, comprising concurrently recording on a plurality of recorders constructed and configured to record telephonic interactions and identify faults occurring therein a telephonic interaction provided by a PBX (Private Branch Exchange) under a control of a computerized apparatus, thus recording and constructing in a storage device a plurality of playlists along with the identified faults in the recording of the playlists, and subsequent to completing the interaction, evaluating for each playlist in the plurality of playlists a quantitative quality score according to the identified faults of each of the playlists, thus reflecting by each score the quality of each playlist in the plurality of playlists, and further presenting the playlists in a prioritized order according to the scores thereof.

In some embodiments, evaluating the quantitative quality score is constructed by a weighted combination of quantifications of faults.

In some embodiments, the weights are determined experimentally.

In some embodiments, presenting the playlists comprises displaying the playlists in a prioritized order, thus facilitating for a user to select playlists according to the evaluated quality thereof.

In some embodiments, presenting the playlists comprises sounding the playlists in a prioritized order, thus sounding the contents of the telephonic interaction to a certain degree of fidelity.

There is thus further provided according to the present disclosure a computerized system for prioritization of recorded playlists, comprising a PBX (Private Branch Exchange) for providing a telephonic interaction, a CTI apparatus (Computer Telephony Integration apparatus) interfacing with the PBX for telephonic call flow control, a plurality of recorders configured to record the telephonic interaction, a computerized apparatus as a controller interfacing with the CTI and configured to control the operations of the plurality of recorders and further configured to obtain information about the progress of and occurrences in the telephonic interaction, a storage device linkable with the plurality of recorders and the controller for storing the playlists and information related to the progress of and occurrences in the telephonic interaction, and a processor operative by a program to evaluate the qualities of the stored playlists and to assign scores of qualities to each playlist and further to prioritize the playlists according to the scores thereof.

In the context of some embodiments of the present disclosure, by way of example and without limiting, terms such as 'operating' or 'executing' imply also capabilities, such as 'operable' or 'executable', respectively.

Conjugated terms such as, by way of example, 'a thing property' implies a property of the thing, unless otherwise clearly evident from the context thereof.

The terms 'processor' or 'computer', or system thereof, are used herein as ordinary context of the art, such as a general purpose processor or a micro-processor, RISC processor, or DSP, possibly comprising additional elements such as memory or communication ports. Optionally or additionally, the terms 'processor' or 'computer' or derivatives thereof denote an apparatus that is capable of carrying out a provided or an incorporated program and/or is capable of controlling and/or accessing data storage apparatus and/or other apparatus such as input and output ports. The terms 'processor' or 'computer' denote also a plurality of processors or computers connected, and/or linked and/or otherwise communicating, possibly sharing one or more other resources such as a memory.

The terms 'software', 'program', 'software procedure' or 'procedure' or 'software code' or 'code' or 'application' may be used interchangeably according to the context thereof, and denote one or more instructions or directives or circuitry for performing a sequence of operations that generally represent an algorithm and/or other process or method. The program is stored in or on a medium such as RAM, ROM, or disk, or embedded in a circuitry accessible and executable by an apparatus such as a processor or other circuitry.

The processor and program may constitute the same apparatus, at least partially, such as an array of electronic gates, such as FPGA or ASIC, designed to perform a programmed sequence of operations, optionally comprising or linked with a processor or other circuitry.

The term computerized apparatus or a computerized system or a similar term denotes an apparatus comprising one or more processors operable or operating according to one or more programs.

As used herein, without limiting, a module represents a part of a system, such as a part of a program operating or interacting with one or more other parts on the same unit or on a different unit, or an electronic component or assembly for interacting with one or more other components.

As used herein, without limiting, a process represents a collection of operations for achieving a certain objective or an outcome.

As used herein, the term 'server' denotes a computerized apparatus providing data and/or operational service or services to one or more other apparatuses.

The term 'configuring' and/or 'adapting' for an objective, or a variation thereof, implies using at least a software and/or electronic circuit and/or auxiliary apparatus designed and/or implemented and/or operable or operative to achieve the objective.

A device storing and/or comprising a program and/or data constitutes an article of manufacture. Unless otherwise specified, the program and/or data are stored in or on a non-transitory medium.

In case electrical or electronic equipment is disclosed it is assumed that an appropriate power supply is used for the operation thereof.

The flowchart and block diagrams illustrate architecture, functionality or an operation of possible implementations of systems, methods and computer program products according to various embodiments of the present disclosed subject matter. In this regard, each block in the flowchart or block diagrams may represent a module, segment, or portion of program code, which comprises one or more executable instructions for implementing the specified logical function(s). It should also be noted that, in some alternative implementations, illustrated or described operations may occur in a different order or in combination or as concurrent operations instead of sequential operations to achieve the same or equivalent effect.

The corresponding structures, materials, acts, and equivalents of all means or step plus function elements in the claims below are intended to include any structure, material, or act for performing the function in combination with other claimed elements as specifically claimed. As used herein, the singular forms "a", "an" and "the" are intended to include the plural forms as well, unless the context clearly indicates otherwise. It will be further understood that the terms "comprises" and/or "comprising" and/or "having" when used in this specification, specify the presence of stated features, integers, steps, operations, elements, and/or components, but do not preclude the presence or addition of one or more other features, integers, steps, operations, elements, components, and/or groups thereof.

The terminology used herein should not be understood as limiting, unless otherwise specified, and is for the purpose of describing particular embodiments only and is not intended to be limiting of the disclosed subject matter. While certain embodiments of the disclosed subject matter have been illustrated and described, it will be clear that the disclosure is not limited to the embodiments described herein. Numerous modifications, changes, variations, substitutions and equivalents are not precluded.

APPENDIX

Below are provided exemplary data structures employed in concurrently recording a telephonic interaction and handling the resulting playlists. The structures and fields names are assumed to be clear for a person skilled in the art.

Interaction Recording Session Structure
Interaction

| Interaction | |
|---|---|
| Sessions[ ] | List of recorded sessions |
| UserID | Integer |
| InteractionID | Long |
| CompoundID | Long |

Recording Session

| Recording Session | |
|---|---|
| Quality (Score) | integer |
| error | bool |
| RecorderID | Integer |
| SessionID | Integer |
| StartTime | DateTime |
| StopTime | DateTime |

Playlist

| Playlist | |
|---|---|
| Score | Playlist score (int) |
| Sessions[ ] | List of recorded session |

DB Schema
Interaction

| Interaction | |
|---|---|
| InteractionID | Long |
| Participants[ ] | Participant |
| Direction | Integer |
| Exception | Reported exception |

-continued

Interaction

| | |
|---|---|
| StartTime | DateTime |
| StopTime | DateTime |

Recording

Recording

| | |
|---|---|
| InteractionID | Long |
| ParticipantID | Integer |
| Direction | Integer |
| Score | Integer |
| Exception | Reported exception |
| RecorderID | Integer |
| SessionID | Integer |
| StartTime | DateTime |
| StopTime | DateTime |

The invention claimed is:

1. A method for quality-dependent playback of recorded playlists, comprising:
    on a plurality of recorders constructed and configured to record telephonic interactions and identify faults occurring therein—concurrently recording a telephonic interaction provided by a PBX (Private Branch Exchange) under a control of a computerized apparatus, thus recording and constructing in a storage device a plurality of playlists, comprising recordings of the telephonic interaction, along with the identified faults in the recordings of the playlists, wherein the plurality of recorders produce parallel recordings of the telephonic interaction;
    using a processor in the computerized apparatus, subsequent to completing the telephonic interaction, evaluating for each playlist in the plurality of playlists a quantitative quality score according to the identified faults of each of the playlists, thus reflecting by each score the quality of each playlist in the plurality of playlists;
    prioritizing the playlists according to the scores thereof; and
    using a sounding component coupled to the computerized apparatus, sounding the playlists in a prioritized order, thus sounding the contents of the telephonic interaction to a certain degree of fidelity.

2. The method according to claim 1, wherein evaluating the quantitative quality score is constructed by a weighted combination of quantifications of faults.

3. The method according to claim 2, wherein the weights are determined experimentally.

4. The method according to claim 1, wherein presenting the playlists comprises displaying the playlists in a prioritized order, thus facilitating for a user to select playlists according to the evaluated quality thereof.

5. A computerized system for quality-dependent playback of recorded playlists, comprising:
    a PBX (Private Branch Exchange) for providing a telephonic interaction;
    a CTI apparatus (Computer Telephony Integration apparatus) interfacing with the PBX for telephonic call flow control;
    a plurality of recorders configured to record the telephonic interaction, wherein the plurality of recorders produce parallel recordings of the telephonic interaction;
    a computerized apparatus as a controller interfacing with the CTI and configured to control the operations of the plurality of recorders and further configured to obtain information about the progress of and occurrences in die telephonic interaction;
    a storage device linkable with the plurality of recorders and the controller for storing playlists, comprising recordings of the telephonic interaction, and information related to the progress of and occurrences in the telephonic interaction;
    a processor configured to evaluate, subsequent to completing the telephonic interaction, the qualities of the stored playlists and to assign scores of qualities to each playlist and further to prioritize the playlists according to the scores thereof; and
    a sounding component coupled to the computerized apparatus for sounding the playlists in a prioritized order, thus sounding the contents of the telephonic interaction to a certain degree of fidelity.

6. The method according to claim 1, wherein the quantitative quality score is evaluated using a formula based on parameters selected from the group consisting of a number of errors, a packet loss, and a recording duration.

7. The computerized system according to claim 5, wherein the processor is configured to evaluate the quality of the stored playlists by a weighted combination contributions of faults in the playlists.

8. The computerized system according to claim 7, wherein the weights are determined experimentally.

9. The computerized system according to claim 5, wherein the processor is configured to present the playlists by displaying the playlists in a prioritized order, thus facilitating for a user to select playlists according to the evaluated quality thereof.

10. The computerized system according to claim 5, wherein the processor is configured to assign scores of qualities to each playlist using a formula based on parameters selected from the group consisting of a number of errors, a packet loss, and a recording duration.

* * * * *